United States Patent [19]

Hölzle et al.

[11] 4,447,357
[45] May 8, 1984

[54] FIBRE-REACTIVE AZO DYESTUFFS CONTAINING A HALOTRIAZINYL RADICAL AND A NON-REACTIVE TRIAZINYL RADICAL

[75] Inventors: Gerd Hölzle, Liestal; Rainer Begrich, Rheinfelden, both of Switzerland

[73] Assignee: Ciba-Geigy Corporation, Ardsley, N.Y.

[21] Appl. No.: 243,233

[22] Filed: Mar. 16, 1981

[30] Foreign Application Priority Data

Mar. 18, 1980 [CH] Switzerland ............... 2125/80

[51] Int. Cl.$^3$ ............... C09B 62/085; C09B 62/09; C09B 62/095; C09B 62/08
[52] U.S. Cl. ............... 260/153; 260/146 T; 260/147
[58] Field of Search ............... 260/153, 154, 146 R, 260/146 D, 146 T, 147

[56] References Cited

U.S. PATENT DOCUMENTS 3,349,074 10/1967 Andrew ............... 260/146 T

FOREIGN PATENT DOCUMENTS 1015931 1/1966 United Kingdom ............... 260/153
1017271 1/1966 United Kingdom ............... 260/153

*Primary Examiner*—Floyd D. Higel
*Attorney, Agent, or Firm*—Joseph G. Kolodny

[57] ABSTRACT

Azo dyes of the formula

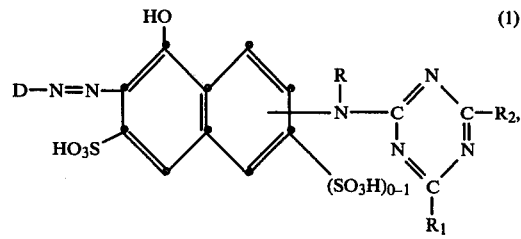

wherein D is benzene, naphthalene, benzoylaminobenzene, azobenzene or stilbene, which is unsubstituted or substituted by alkyl of 1 to 4 carbon atoms, alkoxy of 1 to 4 carbon atoms, phenoxy, alkanoylamino of 1 to 6 carbon atoms, benzoylamino, amino, alkylamino of 1 to 4 carbon atoms, phenylamino, alkoxycarbonyl of 1 to 5 carbon atoms, alkylcarbonyl of 1 to 5 carbon atoms, nitro, cyano, acetyl, carbamoyl, ureido, hydroxy, carboxy, halogen or sulfo, and which contains a dihalo-s-triazinylamino or a monohalo-s-triazinylamino radical substituted by an alkyl, aryl, alkylthio, arylthio, hydroxy, alkoxy, aryloxy, -NH$_2$, alkylamino, arylamino or heterocyclic amino group, wherein the halo-s-triazinylamino radical is bonded directly or via methylene to a ring carbon of D, and the amino group, by which the halo-s-trazinyl radical is bonded to a carbon atom in D is optionally substituted at the nitrogen atom by C$_{1-4}$-alkyl or -sulfoalkyl, R is hydrogen or alkyl of 1 to 4 carbon atoms, and R$_1$ and R$_2$, independently of one another, have the same meaning as those substituents referred to above of monohalo-s-triazinyl radicals in D; or a heavy metal complex thereof, are especially suitable for dyeing cotton fabric according to the exhaustion dyeing method and produce dyeings which have good fastness properties.

9 Claims, No Drawings

FIBRE-REACTIVE AZO DYESTUFFS CONTAINING A HALOTRIAZINYL RADICAL AND A NON-REACTIVE TRIAZINYL RADICAL

The present invention relates to azo dyes of the formula

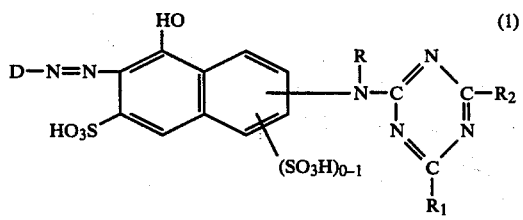

in which D is the radical of an aromatic diazo component, which can have additional substituents and can itself contain an azo bridge, and which contains a halo-s-triazinylamino group, R is hydrogen or alkyl having 1 to 4 carbon atoms and $R_1$ and $R_2$, independently of one another, are unreactive substituents.

The radical D is an aromatic radical which can itself contain an azo group, or is a radical which is derived from a compound of the anthraquinone, nitroaryl, phthalocyanine or stilbene series, or the like. In particular, D is a radical of the benzene or naphthalene series.

The radical D can contain the substituents conventionally present in azo dyes. In particular, the radical D contains sulfonic acid groups. Examples of substituents, additional to these, which the radical D can contain are alkyl groups having 1 to 4 carbon atoms, such as methyl, ethyl, propyl, isopropyl, butyl, isobutyl, sec.-butyl and tert.-butyl, alkoxy groups having 1 to 4 carbon atoms, such as methoxy, ethoxy, propoxy, isopropoxy, butoxy, isobutoxy, sec.-butoxy and tert.-butoxy, phenoxy, acylamino groups having 1 to 6 carbon atoms, such as acetylamino, propionylamino and benzoylamino, amino groups, such as —NH2, methylamino, ethylamino and phenylamino, carboxylic acid ester groups, such as methoxycarbonyl and ethylcarbonyl, the nitro, cyano, acetyl, carbamyl, ureido, hydroxyl and carboxyl groups, and halogen, such as fluorine, chlorine and bromine.

If the radical D contains complex-forming groups, such as hydroxyl, carboxyl, amino and sulfo, in the o-position to the azo group, the heavy metal complexes of the azo dyes of the formula (1) also form part of the invention.

Preferred complex-forming heavy metals are chromium, cobalt, nickel, copper, iron and manganese.

The radical D contains a halo-s-triazinylamino group. This can be a dihalo-s-triazinyl group, for example 2,4-difluoro-, 2,4-dichloro- and 2,4-dibromo-s-triazinyl-6-amino or a monohalo-s-triazinyl group, for example 4-fluoro-, 4-chloro- and 4-bromo-s-triazinyl-6-amino, which are substituted in the 2-position by an aryl or alkyl radical, for example a phenyl, methyl or ethyl radical, or by the radical of an aliphatic or aromatic mercapto compound, bonded via the sulfur atom, or the hydroxyl compound, bonded via the oxygen atom, or especially by a —NH2 group, or the radical of an aliphatic, heterocyclic or aromatic amino compound, bonded via the nitrogen atom.

The amino group, by which the halo-s-triazinyl radical is bonded to a carbon atom in D can be substituted at the nitrogen atom, for example by alkyl, such as methyl or ethyl, or sulfoethyl. The halo-s-triazinylamino group can be bonded directly to an aromatic carbon atom in D, or can be bonded thereto via an alkylene group, for example a methylene group.

The substituent R in formula (1) can be methyl, ethyl, propyl, isopropyl, butyl, isobutyl, sec.-butyl or tert.-butyl or, preferably, hydrogen.

Suitable unreactive substituents $R_1$ and $R_2$ are the same radicals as those referred to above as substituents in the 2-position of monohalo-s-triazinyl radicals in D, ie. aryl and alkyl radicals, such as phenyl, methyl and ethyl, or radicals of aliphatic or aromatic mercapto compounds, bonded via the sulfur atom, or of hydroxyl compounds, bonded via the oxygen atom, or, in particular, the —NH2 group or radicals of aliphatic, aromatic or heterocyclic amino compounds, bonded via the nitrogen atom.

Preferred azo dyes are those of the formula

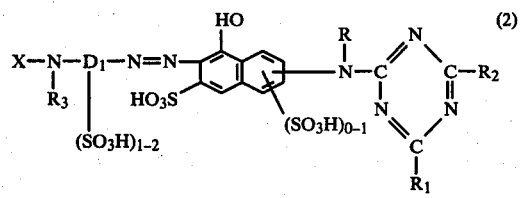

in which $D_1$ is a benzene or naphthalene radical which can be substituted further, X is a fluoro-s-triazinyl or chloro-s-triazinyl group, $R_3$ is hydrogen or alkyl having 1 to 4 carbon atoms, R is hydrogen or alkyl having 1 to 4 carbon atoms and $R_1$ and $R_2$, independently of one another, are unreactive substituents.

The benzene or naphthalene radical $D_1$ can be substituted further, for example by the substituents mentioned above as possible substituents of D in formula (1).

Especially preferred azo dyes of the formula (2) are those in which X is a monofluoro-s-triazinyl or monochloro-s-triazinyl group, $R_3$ is hydrogen or methyl, R is hydrogen or methyl, and $R_1$ and $R_2$, independently of one another, are unsubstituted or substituted hydroxyl or amino groups.

Other preferred azo dyes are those of the formula

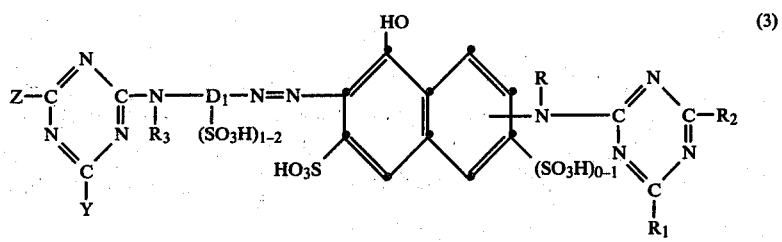

in which $D_1$ is a sulfobenzene radical, a sulfobenzene-$CH_2$— radical, which can be substituted by methoxy, or a sulfonaphthalene-$CH_2$— radical, Y is fluorine or chlorine, Z is amino, $C_{1-4}$-alkylamino or N,N-di-$C_{1-4}$-alkylamino, in which the alkyl radicals can be substituted by hydroxyl or sulfo, or is cyclohexylamino, or is phenylamino which can be substituted in the phenyl nucleus by methyl, methoxy, ethoxy, chlorine, carboxyl, sulfo, $\beta$-sulfatoethylsulfonyl, acetylamino, oxaloamino or ureido, or is morpholino, benzthiazolyl-2-amino, thiazolyl-2-amino or 4-methyl-5-sulfobenzthiazolyl-2-phenylamino, or is N—$C_{1-2}$-alkyl-N-phenylamino, in which the alkyl radical can be substituted by hydroxyl, or is $C_{1-4}$-alkoxy or $C_{1-2}$-alkoxy-$C_{1-2}$-alkoxy, $R_3$ is hydrogen or methyl, R is hydrogen or methyl and $R_1$ and $R_2$, independently of one another, are hydroxyl, methoxy, isopropoxy, phenoxy, amino, $\beta$-hydroxyethylamino, N,N-di-$\beta$-hydroxyethylamino, $\beta$-sulfoethylamino, $\beta$-carboxyethylamino, N-methyl-N-$\beta$-sulfoethylamino, phenylamino, sulfophenylamino, carboxyphenylamino, sulfo-carboxyphenylamino, N-methyl-N-phenylamino or morpholino.

An important sub-group of the azo dyes of the formula (3) comprises the azo dyes of the formula

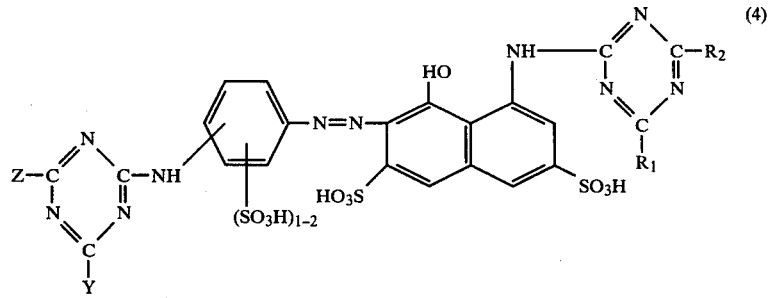

in which Y, Z, $R_1$ and $R_2$ are as defined for formula (3).

Amongst the azo dyes of the formula (4), those of the formula

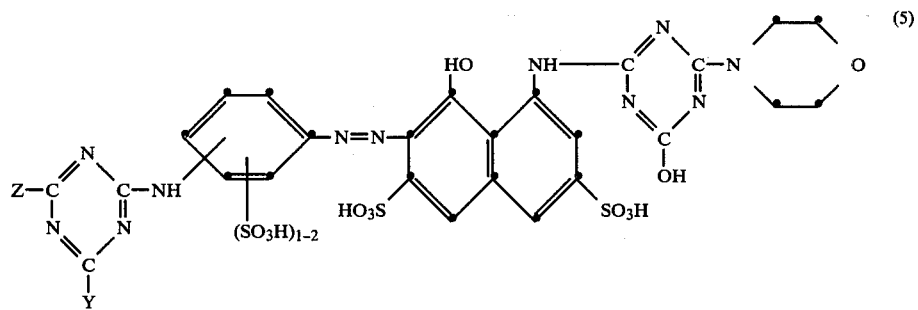

in which Y and Z are as defined for formula (4), are of particular importance. Preferably, Y in formula (5) is fluorine.

Valuable dyes having the structure defined by formula (5) are those of the formulae

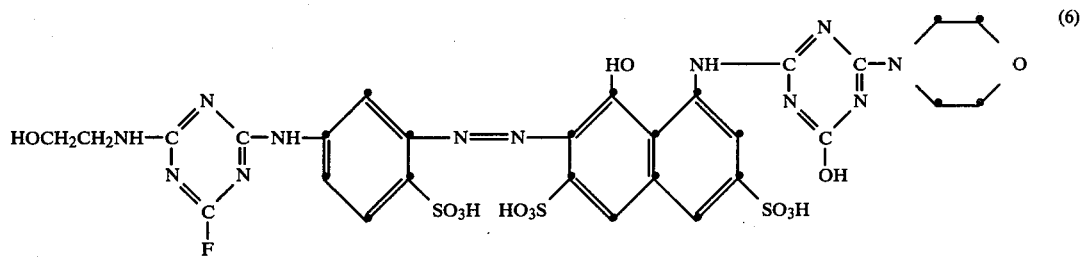

and

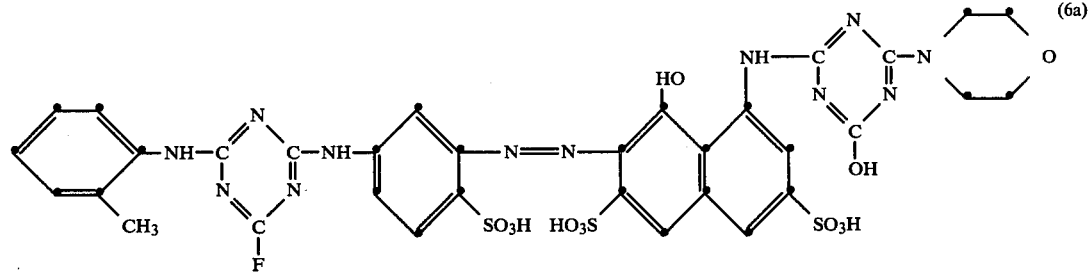

Since the azo dyes of the formula (1) contain a halo-s-triazinylamino group in the radical D, they are reactive.

Reactive or fibre-reactive radicals are to be understood as meaning radicals which are able to react with the hydroxyl groups of cellulose, or with the amino groups of natural or synthetic polyamides, to form covalent chemical bonds.

To prepare an azo dye of the formula (1), a diazotized diazo component of the formula

D—NH$_2$, (7)

a coupling component of the formula

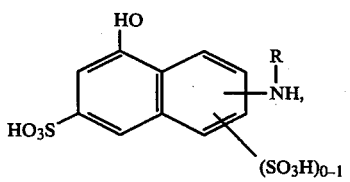

(8)

a trihalo-s-triazine of the formula

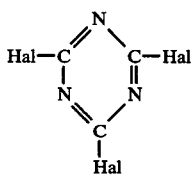

(9)

and the compounds of the formulae

R$_1$—H (10)

and

R$_2$—H (11)

are coupled, and condensed, with one another and a halo-s-triazinyl radical is introduced into the radical D, which must still contain an amino group capable of acylation.

If the radical D of the diazo components of the formula (7) contains a complex-forming group in the ortho-position to the —NH$_2$ group, the azo dyes obtained can be reacted with heavy metal donors.

Preferred diazo components of the formula (7) are those of the benzene series or naphthalene series.

Since the individual process steps referred to above, namely coupling and multiple condensation, can be carried out in different sequences and, where appropriate, can in part also be carried out simultaneously, a plurality of embodiments of the process are feasible. The starting materials to be used for each component reaction follow from formula (1). In general, the reaction is carried out in stepwise succession, the sequence of the simple reactions between the individual reactants of the formulae (7) to (11) and the halo-s-triazine, which is being introduced into the radical D, being optional.

The following are the most important embodiments of the process:

1. A coupling component of the formula (8) is condensed with a trihalo-s-triazine of the formula (9), the resulting primary condensation product is coupled with a diazotised diazo component of the formula (7), the monoazo compound is condensed with the compounds of the formulae (10) and (11), and the resulting condensation product is condensed with a dihalo-s-triazine or trihalo-s-triazine, after which a halogen atom of the triazine can be replaced by an unreactive substituent by condensation with a compound which contains easily detachable hydrogen.

2. A compound which contains easily detachable hydrogen, a trihalo-s-triazine and a diazo component of the formula (7) are condensed and the secondary condensation product is diazotised and is coupled with the tertiary condensation product obtained from a coupling component of the formula (8), a trihalo-s-triazine of the formula (9) and the compounds of the formulae (10) and (11).

3. A coupling component of the formula (8) is condensed with a trihalo-s-triazine of the formula (9), the primary condensation product is condensed with the compounds of the formulae (10) and (11), the resulting condensation product is coupled with a diazotised diazo component of the formula (7) and the monoazo compound is condensed with a dihalo-s-triazine or a trihalo-s-triazine, after which a halogen atom of the triazine can be replaced by an unreactive substituent by condensation with a compound which contains easily detachable hydrogen.

If the halo-s-triazinyl group to be introduced into the radical of the diazo component is to be a fluoro-s-triazinyl group, it is advantageous first to proceed as above, then to isolate the monoazo compound, redissolve this in an aqueous alkaline solution, for example a sodium hydroxide, potassium hydroxide, lithium hydroxide, ammonium hydroxide or sodium carbonate solution, react it with cyanuric fluoride and then, if desired, replace a fluorine atom on the triazine radical by an unreactive substituent by condensation with a compound which contains easily detachable hydrogen.

Suitable compounds which contain easily detachable hydrogen are, in particular, hydroxyl, mercapto and amino compounds.

In the preferred process for the preparation of the compounds of the above formulae (6) and (6a), 1-amino-8-hydroxynaphthalene-3,6-disulfonic acid is condensed with cyanuric chloride, the primary condensation product is condensed with morpholine, the secondary condensation product is coupled with diazotised 1-amino-3-acetylaminobenzene-6-sulfonic acid, the residual chlorine atom on the triazine is replaced by hydroxyl by means of hydrolysis, the acetyl group is detached by saponification and the resulting amino compound is condensed with cyanuric fluoride and lastly with ethanolamine or o-toluidine.

In accordance with the method of preparation described above, the azo dyes of the formula (1) can be prepared by using diazo components or coupling components which already contain reactive radicals.

In many cases, however, it is also possible to introduce reactive radicals subsequently into the azo dyes of the formula (1). This can be done after coupling or, where relevant, after metallisation. The reactive radical is introduced by acylating the diazo component, which in addition to the amino group to be diazotised contains a further amino group which can be acylated or a group which can be converted, for example by reduction or hydrolysis, into an amino group which can be acylated, such as the nitro group or the acetylamino group or, where the reactive radical is introduced subsequently, by acylating the corresponding aminoazo dye which contains an amino group which can be acylated.

In a further embodiment, the azo dyes of the formula (1) can be obtained by carrying out the coupling with a coupling component of the formula (8) and subjecting the condensable —N(R)H group, in the coupling component, to condensation with a compound of the formula

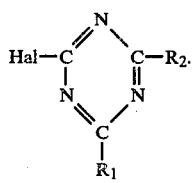 (12)

In the examples which follow, the preparation of the intermediates is not described in every case, but the method by which they are prepared follows directly from what has been stated above.

Examples of starting materials which can be used to prepare the azo dyes of the formula (1) are:

DIAZO COMPONENTS OF THE FORMULA (7)

1,3-Diaminobenzene-4-sulfonic acid, 1,3-diaminobenzene-4,6-disulfonic acid, 1,4-diaminobenzene-2-sulfonic acid, 1,4-diaminobenzene-2,5- or -2,6-disulfonic acid, 1,4-diamino-2-chlorobenzene-5-sulfonic acid, 1,4-diamino-2-methylbenzene-5-sulfonic acid, 1,3-diamino-4-methylbenzene-6-sulfonic acid and their monoacetyl derivatives, 3-(3'- or 4'-aminobenzoylamino)-1-amino-benzene-6-sulfonic acid, 1-(4'-aminobenzoylamino)-4-aminobenzene-2,5-disulfonic acid, 4-nitro-2-aminophenol-6-sulfonic acid, 2,6-diaminonaphthalene-4,8-disulfonic acid, 1-amino-4-methoxy-5-aminomethylbenzene-6-sulfonic acid, 2-amino-5-aminomethyl-naphthalene-1-sulfonic acid, 4-amino-4'-acetylamino-azobenzene-3-sulfonic acid, 4-amino-4'-nitrostrilbene-2,2'-disulfonic acid and 1-amino-3-N-methylaminomethylbenzene-6-sulfonic acid.

COUPLING COMPONENTS OF THE FORMULA (8)

1-Amino-8-naphthol-3,6-disulfonic acid, 1-amino-8-naphthol-4,6-disulfonic acid, 2-amino-5-naphthol-7-sulfonic acid, 1-amino-8-naphthol-2,4-disulfonic acid, 1-amino-8-naphthol-4-sulfonic acid, 2-amino-8-naphthol-6-sulfonic acid, 2-amino-6-naphthol-8-sulfonic acid, 1-amino-5-naphthol-7-sulfonic acid, 2-amino-8-naphthol-3,6-disulfonic acid, 2-amino-5-naphthol-7,1-disulfonic acid, 2-N-methylamino-5-naphthol-7-sulfonic acid and 2-N-methylamino-8-naphthol-6-sulfonic acid.

TRIHALO-S-TRIAZINES OF THE FORMULA (9)

Cyanuric fluoride, chloride and bromide.

COMPOUNDS OF THE FORMULAE (10) AND (11)

Ammonia, methylamine, dimethylamine, ethylamine, diethylamine, propylamine, isopropylamine, butylamine, dibutylamine, isobutylamine, sec.-butylamine, tert.-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-sulfatoethylamine, benzylamine, cyclohexylamine, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, N-β-hydroxyethylaniline, 3- and 4-acetylaminoaniline, o-, m- and p-nitroaniline, o-, m- and p-aminophenol, 2-methyl-4-nitroaniline, 2-methyl-5-nitroaniline, 2,5-dimethoxyaniline, 3-methyl-4-nitro-aniline, 2-nitro-4-methylaniline, 3-nitro-4-methylaniline, o-, m- and p-anisidine, o-, m- and p-phenetidine, naphthyl-1-amine, naphthyl-2-amine, 2-amino-1-hydroxynaphthalene, 1-amino-4-hydroxynaphthalene, 1-amino-8-hydroxynaphthalene, 1-amino-2-hydroxynaphthalene, 1-amino-7-hydroxynaphthalene, orthanilic acid, metanilic acid, sulfanilic acid, aniline-2,4-disulfonic acid, aniline-2,5-disulfonic acid, anthranilic acid, m- and p-aminobenzoic acid, 2-aminotoluene-4-sulfonic acid, 2-aminotoluene-5-sulfonic acid, p-aminosalicyclic acid, 1-amino-4-carboxy-benzene-3-sulfonic acid, 1-amino-2-carboxy-benzene-5-sulfonic acid, 1-amino-5-carboxybenzene-2-sulfonic acid, naphthyl-1-amine-2-, -3-, -4-, -5-, -6-, -7- and -8-sulfonic acid, naphthyl-2-amine-1-, -3-, -4-, -5-, -6-, -7- and -8-sulfonic acid, naphthyl-1-amine-2,4-, -2,5-, -2,7-, -2,8-, -3,5-, -3,6-, -3,7-, -3,8-, -4,6-, -4,7-, -4,8- and -5,8-disulfonic acid, naphthyl-2-amine-1,5-, -1,6-, -1,7-, -3,6-, -3,7-, -4,7-, -4,8-, -5,7- and -6,8-disulfonic acid, naphthyl-1-amine-2,4,6-, -2,4,7-, -2,5,7-, -3,5,7-, -3,6,8- and -4,6,8-trisulfonic acid, naphthyl-2-amine-1,3,7-, -1,5,7-, -3,5,7-, -3,6,7-, -3,6,8- and -4,6,8-trisulfonic acid, 2-, -3- and 4-aminopyridine, 2-aminobenzthiazole, 5-, 6- and 8-aminoquinoline, 2-aminopyrimidine, morpholine, piperidine, piperazine, water, methanol, ethanol, propanol, isopropanol, n-butanol, isobutanol, sec.-butanol, tert.-butanol, hexanol, cyclohexanol, β-methoxyethanol, β-ethoxyethanol, γ-methoxypropanol, γ-ethoxypropanol, β-ethoxy-β-ethoxyethanol, glycollic acid, phenol, o-, m- and p-chlorophenol, o-, m- and p-nitrophenol, o-, m- and p-hydroxybenzoic acid, o-, m- and p-phenolsulfonic acid, phenol-2,4-disulfonic acid, α-naphthol, β-naphthol, 1-hydroxynaphthalene-8-sulfonic acid, 2-hydroxynaphthalene-1-sulfonic acid, 1-hydroxynaphthalene-5-sulfonic acid, 1-hydroxynaphthalene-4-sulfonic acid, 1-hydroxynaphthalene-6- and -7-sulfonic acid, 2-hydroxynaphthalene-6-, -7- and -8-sulfonic acid, 2-hydroxynaphthalene-4-sulfonic acid, 2-hydroxynaphthalene-4,8- and -6,8-disulfonic acid, 1-hydroxynaphthalene-4,8-disulfonic acid, 2-hydroxynaphthalene-3,6-disulfonic acid, methanethiol, ethanethiol, propanethiol, isopropanethiol, n-butanethiol, thioglycollic acid, thiophenol, α-thionaphthol and β-thionaphthol.

Examples of compounds which can be used as acylating agents for introducing a halo-s-triazine radical into the radical D are 2,4,6-trichloro, 2,4,6-tribromo- and 2,4,6-trifluoro-s-triazine, and 4,6-dichloro-, 4,6-dibromo- and 4,6-difluoro-s-triazines, which are substituted in the 2-position by an aryl or alkyl radical, for example a phenyl, methyl or ethyl radical, or by the radical of an aliphatic or aromatic mercapto compound, bonded via the sulfur atom, or of a hydroxyl compound, bonded via the oxygen atom, or especially by a —NH$_2$ group or by the radical of an aliphatic, heterocyclic or aromatic amino compound, bonded via the nitrogen atom.

The 2-substituted 4,6-dihalo-s-triazines are obtained, for example, by reacting a trihalo-s-triazine with the amino, hydroxy or mercapto compounds mentioned above.

The substituent in the 2-position of the triazine radical can also be introduced after coupling or after metallising. Accordingly, for example, one of the amino, hydroxy or mercapto compounds mentioned above can be subsequently condensed with a dihalo-s-triazine radical which is already bonded to the azo dye of the formula (1). This possibility must also be considered, inter alia, in the process for the preparation of the azo dyes of the formula (1), described above.

The compounds, containing easily detachable hydrogen, which have been mentioned above are in particular to be understood as meaning compounds which contain reactive hydrogen bonded via a hetero-atom. Suitable compounds of this type are, in particular, the amino, hydroxy and mercapto compounds mentioned above.

Examples of aminoazo dyes, into which the reactive radicals can be introduced after coupling, are the coupling products of the diazo components of the formula (7), mentioned above, with coupling components of the formula (8).

Further important azo dyes of the formula (1) are those which possess a monohalotriazine radical which is bonded via an amino group and which in addition to the halogen atom contains an amino group bonded to the triazine ring, a further reactive radical, in particular a halotriazine radical, being bonded to this amino group. If the second, additional reactive radical is a halotriazine radical, it is preferably bonded to the first triazine radical via the radical of an alkylenediamine or arylenediamine. The fibre-reactive amino group which is present, additionally to the halogen atom, on the monohalotriazine radical accordingly preferably has the structure

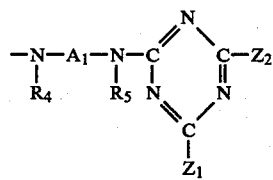

(13)

in which $R_4$ and $R_5$ are hydrogen or alkyl having 1 to 4 carbon atoms, $A_1$ is an alkylene or arylene radical, $Z_1$ is a halogen atom, for example a fluorine, chlorine or bromine atom, and $Z_2$ is a halogen atom or an amino, alkoxy, aryloxy, alkylthio or arylthio group. $A_1$ can be a relatively short-chain or relatively long-chain alkylene radical, for example an ethylene or hexylene radical, but is preferably a benzene radical, for example an m- or p-phenylene radical, and especially a phenylenesulfonic acid radical. Examples of amino, alkoxy, aryloxy, alkylthio or arylthio groups $Z_2$ are the radicals of the amino, hydroxy and mercapto compounds mentioned above.

In a particular embodiment, $Z_2$ in formula (13) is identical with the chromogenic radical of the azo dye of the formula (1).

The condensation of 2,4,6-trihalo-s-triazines with diazo components and coupling components, and with amino, hydroxy and mercapto compounds, is preferably carried out in aqueous solution or suspension, at a low temperature and at an acidic, neutral or slightly alkaline pH, under conditions such that in the finally obtained azo dye of the formula (1) there remains, as a detachable radical, a halogen atom of the triazine ring present in the radical D. Advantageously, the hydrogen halide set free during the condensation is neutralised continuously by addition of aqueous alkali metal hydroxide, carbonate or bicarbonate.

The condensations are, for example, carried out with cyanuric halides, such as cyanuric chloride, at about 0° to 10° C. in an acid or neutral medium, with 1,3,5-triazine-dihalides at about 10° to 50° C. in a neutral medium, and with 1,3,5-triazine-monohalides at 70° to 100° C. in a neutral medium. The reaction is carried out at the lowest temperature, for example 0° to 60° C., compatible with the reactivity of the components, and at a pH value of the aqueous solution of 1 to at most 9, in the presence of buffer salts, such as alkali metal salts of polybasic inorganic acids or organic acids, as mineral acid acceptors, for example in the presence of the sodium salts of the phosphoric acids, of carbonic acid or of acetic acid.

The coupling components which contain the s-triazinylamino groups according to the definition given, possessing the unreactive substituents $R_1$ and $R_2$, are obtained, for example, by stepwise reaction of 1 mol of cyanuric chloride with 1 mol of the corresponding coupling component containing a —N(R)H group and with 1 mol each of a compound of the formula (10) and a compound of the formula (11).

The diazotisation of the diazo components of the formula (7) is as a rule effected by treatment with nitrous acid in an aqueous solution, containing a mineral acid, at a low temperature, whilst the coupling to the coupling components of the formula (8) is carried out at a slightly acid, neutral or slightly alkaline pH value.

If the radical D in formula (1) contains a complex-forming group, for example a hydroxyl or carboxyl group or an alkoxy group, such as a methoxy group, in the orthoposition to the azo group, the azo dyes obtained can, either before or after their conversion to reactive dyes, be converted to their heavy metal complexes, for example to the copper, chromium, nickel or cobalt complexes. The reaction with a heavy metal donor is accordingly carried out at any suitable stage of the reaction sequence, for example before or after the reaction with the compounds of the formulae (10) and (11).

For this purpose, the metal donors used are, for example, salts containing the said metals as the cation, such as chromium sulfates, cobalt acetates, cobalt sulfate, copper sulfate and copper acetate. In some cases, it is advantageous to use complex metal compounds, for example in the form of metal-ammine complexes, such as copper-ammine sulfates obtained from copper sulfate and ammonia, pyridine or monoethanolamine, or in the form of compounds which contain one of the said metals in a complex anion, for example complex chromium compounds of organic hydroxycarboxylic acids, such as salicylic acid, or complex cobalt or copper compounds of the alkali metal salts of aliphatic aminocarboxylic acids or hydroxycarboxylic acids, such as of glycine, of lactic acid and especially of tartaric acid, for instance sodium copper-tartrate.

The treatment with the metal donor can be carried out by methods known per se, for example at room temperature or moderately elevated temperature if the starting dyes are easily metallisable, or, if dealkylation must take place simultaneously with metallisation, by heating to temperatures of between 50° and 120° C. in an open vessel, for example under reflux, or, where necessary, in a closed vessel under pressure. The pH conditions are determined by the nature of the metallising process employed; for example, coppering with copper sulfate is carried out under acid conditions and coppering with copper-tetramine sulfate is carried out under alkaline conditions. If desired, a solvent, for example alcohol, dimethylformamide or the like, can be added for the metallisation.

The metal complex compounds obtainable can contain one atom of metal, bound as a complex, per one or two azo dye molecules. For example, when using copper compounds and nickel compounds as the metal donor, compounds which contain one atom of metal per azo dye molecule are preferably obtained, whilst when using chromium and especially when using cobalt, the 1:2 compounds are easily obtainable and particularly valuable.

Instead of the o,o'-dihydroxy-azo dyes, the corresponding o-alkoxy-o'-hydroxy-azo dyes can also be used as starting materials; in that case, the alkyl group of the o-alkoxy radical is detached during metallisation and the metal complexes obtained are the same as those obtained from the o,o'-dihydroxy dyes.

The azo dyes of the formula (1) can be isolated and converted to useful dry dye formulations. Preferably, they are isolated at as low a temperature as possible by salting out and filtration. After having been filtered off, the dyes can be dried, if desired after addition of extenders and/or buffers, for example after addition of a mixture of equal parts of monosodium phosphate and disodium phosphate; preferably, drying is carried out under reduced pressure and without using excessively high temperatures. In some cases, the dry formulations according to the invention can be obtained direct, ie. without intermediate isolation of the dye, by spray-drying of the complete reaction mixture.

The azo dyes of the formula (1), and their heavy metal complexes, are novel compounds; they are useful for dyeing and printing very diverse materials, for example silk, leather, wool, synthetic high-molecular weight polyamide and high-molecular weight polyurethane fibres, and polyhydroxylic materials, for example cellulosic materials of fibrous structure, such as linen, cellulose, regenerated cellulose, cotton and the like.

The azo dyes of the formula (1) are used to dye nitrogen-containing fibres, for example high-molecular weight polyamides, high-molecular weight polyurethanes, silk, leather and especially wool, for instance from a weakly acid, neutral or weakly alkaline bath, with or without addition of the conventional assistants, such as ethylene oxide adducts of high-molecular weight amines, and especially for dyeing cellulosic materials, in particular cotton, for example by exhaustion, using a long liquor, from an alkaline aqueous bath which can have a high salt content, and especially by pad-dyeing, in which the goods are impregnated with an aqueous dye solution, which can also contain salt, and the dyes are fixed after an alkali treatment, or in the presence of alkali, with or without use of heat.

The reactive dyes can also be used for printing, especially of cotton, but also of nitrogen-containing fibres, for example wool or silk, or union fabrics containing wool.

The dyeings and prints are distinguished by interesting and valuable, very pure and brilliant shades. They have good stability to acids and alkalis and good resistance to synthetic resin finishes, good lightfastness and, especially on cotton, excellent wetfastness. The high degree of fixing, and the easy removability of non-fixed dye, also warrant mention.

To improve the wetfastness properties, it is advisable to rinse the dyes and prints obtained thoroughly with cold and hot water, where appropriate with addition of a dispersant which assists the diffusion of any non-fixed dye.

In the examples which follow, parts are by weight unless stated otherwise, percentages are by weight and temperatures are in degrees centigrade. Parts by weight bear the same relation to parts by volume as that of the gram to the cubic centimeter.

EXAMPLE 1

31.9 parts of H-acid are stirred into 100 parts of water and neutralised with sodium hydroxide. This solution is added dropwise to a suspension consisting of 18.5 parts of finely milled cyanuric chloride in 70 parts of water and 70 parts of ice. The reaction mixture is stirred for 1 to 2 hours and kept at 0° to 5° C., by addition of ice, until a clear solution has formed.

21.8 parts of 3-aminoacetanilide-4-sulfonic acid are diazotised in the usual manner and then coupled with the cyanurated H-acid, the coupling mixture being neutralised in the course of 2 hours with sodium hydroxide solution, and the temperature being raised to 20°-25° C.

8.3 parts of morpholine are added dropwise to the resulting suspension of the monoazo dye. The pH is brought to 7.5 by adding sodium hydroxide solution, the temperature is raised to 35°-40° C. and the mixture is stirred for 1 hour. A clear solution is obtained.

The chlorine still remaining on the triazine ring is split off by adding 20 parts by volume of concentrated sodium hydroxide solution and then stirring for two hours at 95° to 100° C.

To saponify the acetyl group, 30 parts of sodium hydroxide (5% of the volume) are added and the mixture is stirred for 4 hours at 95° to 100° C.

The reaction solution is neutralised with concentrated hydrochloric acid and the dye is precipitated with sodium chloride, filtered off and dried. It has the formula

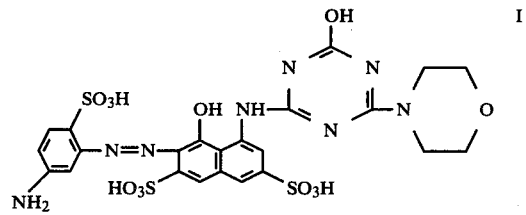

molecular weight 698.

If the chlorine which remains on the triazine ring is replaced by diethanolamine, the compound of the formula

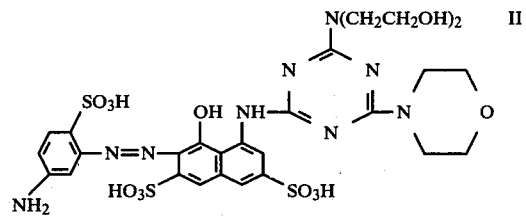

molecular weight 785 is obtained.

EXAMPLE 2

13.2 parts of aminodifluorotriazine are suspended in a fine form in 200 parts of water and 100 parts of ice. A neutral solution of 69.8 parts of dye I, obtained in Example 1, in 1,000 parts of water is added. Acylation takes place on stirring for two hours at 15° to 20° C., The reaction mixture is kept at pH 7 by dropwise addition of dilute sodium hydroxide solution. The resulting reactive dye is precipitated with sodium chloride, filtered off and dried.

The product dyes cellulose fibres, by the method specified in Dyeing Instruction I, in brilliant red shades having good fastness properties. The dyeings are easily dischargeable to white.

EXAMPLE 3

If, in place of the aminodifluorotriazine employed in Example 2, a corresponding amount of the primary condensation product of cyanuric chloride and aniline-2,5-disulfonic acid is used, the dye obtained dyes cellulose fibres, by the printing process specified in Dyeing Instruction II, in red shades having good fastness properties. The very good print obtained on regenerated cellulose is particularly noteworthy.

EXAMPLE 4

46 parts of the secondary condensation product of 1 mol of 2-aminobenzenesulfonic acid, 1 mol of trifluorotriazine and 1 mol of 1,3-diaminobenzene-4-sulfonic acid are diazotised in the conventional manner. The diazo suspension is added to a solution, cooled to 0° C., of the sodium salt of 66 parts of the tertiary condensation product of 1 mol of cyanuric chloride, 1 mol of 1-amino-8-hydroxynaphthalene-3,6-disulfonic acid, 1 mol of 1-aminobenzene-3-sulfonic acid and 1 mol of aminobenzene, in 600 parts of water and 40 parts of sodium carbonate. After completion of coupling, the dye is precipitated by adding sodium chloride, and is filtered off and dried.

The novel dye has the following structure:

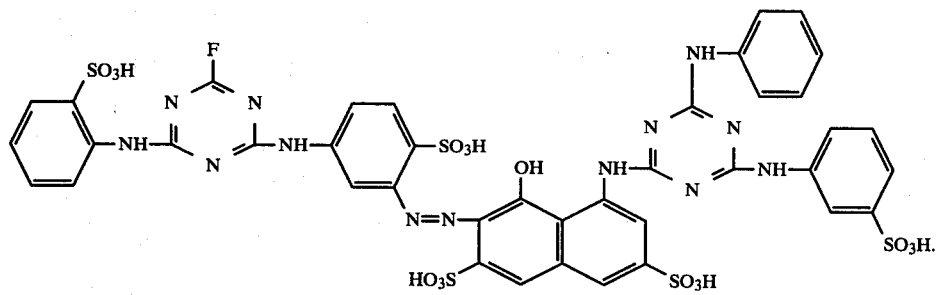

The product dyes cellulose fibres, by the method specified in Dyeing Instruction I, in brilliant red shades having good fastness properties. The dyed materials can be discharged to white.

If, in Examples 1 to 4, H-acid is replaced, as the coupling component, by 1-amino-8-hydroxynapthalene-4,6-disulfonic acid (K-acid), 2-amino-5-hydroxynaphthalene-7-sulfonic acid (J-acid), 2-N-methylamino-5-hydroxynaphthalene-7-sulfonic acid or 2-amino-8-hydroxynaphthalene-6-sulfonic acid (γ-acid), the reactive dyes obtained again dye cellulose fibres, by the methods specified in Dyeing Instructions I and II, in red shades having good fastness properties.

The table which follows lists further dyes which have the general formula

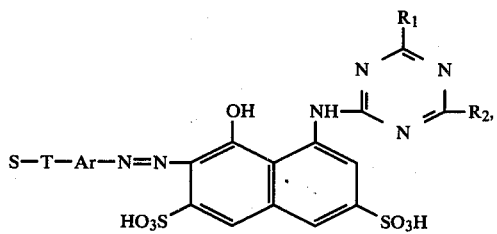

can be prepared analogously to Examples 1 to 4, and have comparably good properties. All the dyes shown in the table which follows dye cotton in red shades.

TABLE

| No. | S | T | Ar | $R_1$ | $R_2$ |
|---|---|---|---|---|---|
| 1 | SO₃H–⟨benzene⟩–NH– | F–triazine | –HN–⟨benzene(CH₃)⟩–SO₃H | –N⟨morpholine⟩O | –N(CH₂CH₂OH)₂ |
| 2 | " | " | " | –N(CH₂CH₂OH)₂ | " |
| 3 | " | " | " | –OH | " |
| 4 | " | " | " | –NH₂ | " |
| 5 | " | " | " | –OCH₃ | " |
| 6 | " | " | " | –NH–⟨benzene⟩–SO₃H | " |
| 7 | " | " | " | –NH–⟨benzene⟩–COOH | " |
| 8 | " | " | " | –NHCH₂CH₂OH | " |
| 9 | " | " | " | –NHCH₂CH₂SO₃H | " |

| No. | S | T | Ar | R₁ | R₂ |
|---|---|---|---|---|---|
| 10 | " | " | " | —N(CH₃)—CH₂CH₂SO₃H | " |
| 11 | " | " | " | —NHCH₂CH₂COOH | " |
| 12 | " | " | " | " | 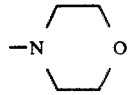 (morpholino) |
| 13 | " | " | " | —OCH(CH₃)₂ | " |
| 14 | " | " | " | 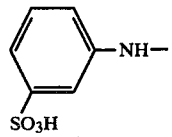 —NH—C₆H₃(SO₃H)(COOH) | " |
| 15 | " | " | " | —NHCH₂CH₂SO₃H | " |
| 16 | 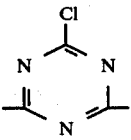 m-SO₃H-C₆H₄-NH— | 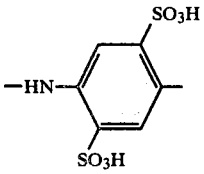 chloro-triazine | 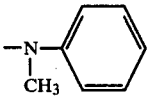 —NH-C₆H₃(SO₃H)₂ | —N(CH₂CH₂OH)₂ | —N(CH₂CH₂OH)₂ |
| 17 | " | " | " | 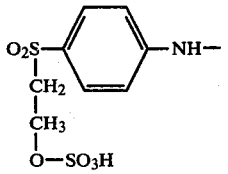 —N(CH₃)-C₆H₅ | " |
| 18 | 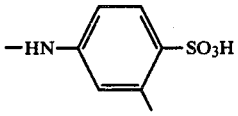 4-(β-sulfatoethylsulfonyl)aniline-NH— | " | 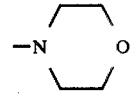 —NH-C₆H₃(CH₃)(SO₃H) | —N(CH₂CH₂OH)₂ | 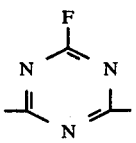 (morpholino) |
| 19 | " | 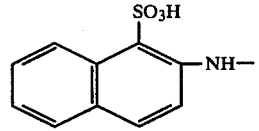 fluoro-triazine | " | " | " |
| 20 | 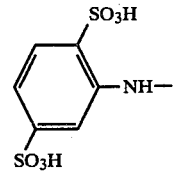 1-SO₃H-2-naphthyl-NH— | " | " | " | " |
| 21 | 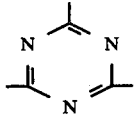 2,5-disulfoanilino | 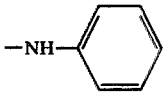 chloro-triazine | " | " | —NH-C₆H₅ |
| 22 | " | " | " | " | 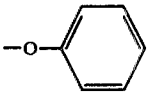 —O-C₆H₅ |

TABLE-continued

| No. | S | T | Ar | $R_1$ | $R_2$ |
|---|---|---|---|---|---|
| 23 | $H_2N-$ | 2-fluoro-1,3,5-triazine (F at 4-position, open at 6-position) | 2-methyl-5-(−HN−CH$_2$−)naphthalene-1-sulfonic acid | −N(morpholino) | −OH |
| 24 | 2-(naphthylamino)-1-sulfonic acid (−NH− at 2-position, SO$_3$H at 1) | 2-fluoro-1,3,5-triazine | −HN−C$_6$H$_3$(CH$_3$)−SO$_3$H (3-methyl-4-sulfoanilino) | −OH | −N(morpholino) |
| 25 | −NH−C$_6$H$_3$(Cl)(SO$_3$H) (2-chloro-5-sulfoanilino) | " | " | " | " |
| 26 | −NH−C$_6$H$_3$(OCH$_3$)(SO$_3$H) (4-methoxy-2-sulfoanilino) | " | " | " | " |
| 27 | −NH−C$_6$H$_3$(CH$_3$)(SO$_3$H) (4-methyl-2-sulfoanilino) | " | " | " | " |
| 28 | −NH−C$_6$H$_3$(NHCOCH$_3$)(SO$_3$H) (4-acetylamino-2-sulfoanilino) | " | " | " | " |
| 29 | −NH−C$_6$H$_3$(NHCOCH$_3$)(SO$_3$H) (3-acetylamino-4-sulfoanilino) | " | −HN−C$_6$H$_3$(CH$_3$)−SO$_3$H | " | " |
| 30 | −NH−naphthalene-(SO$_3$H)(SO$_2$NH$_2$) (6-amino-1-sulfo-4-sulfamoylnaphthalene residue) | " | " | " | " |
| 31 | −NH−C$_6$H$_3$(SO$_3$H)−benzothiazol-2-yl (with CH$_3$ and SO$_3$H on benzothiazole ring) | " | " | " | " |
| 32 | −OCH$_3$ | 2-chloro-1,3,5-triazine | " | " | " |
| 33 | −OC$_2$H$_5$ | " | " | " | " |

TABLE-continued

| No. | S | T | Ar | $R_1$ | $R_2$ |
|---|---|---|---|---|---|
| 34 | $-OCH(CH_3)_2$ | triazine with Cl | $-NH-$ (phenyl with $-SO_3H$ and $-CH_3$) | " | " |
| 35 | $-OCH_2CH_2OCH_2CH_3$ | " | $-NH-$ (phenyl with two $-SO_3H$) | " | " |
| 36 | $-NH-$ (phenyl with $-SO_3H$) | " | naphthyl with $-SO_3H$, $HO_3S-$, $-NH-CH_2$ | " | $-N(CH_2CH_2OH)_2$ |
| 37 | " | triazine with F | " | " | " |
| 38 | $-NH-$ (phenyl with $-SO_3H$) | " | phenyl with $-SO_3H$, $H_3CO-$, $-HN-CH_2$ | " | " |
| 39 | $-NH-$ (phenyl with two $-SO_3H$) | " | naphthyl with two $-SO_3H$, $-HN-$ | $-NH_2$ | " |
| 40 | $-NH-$ (phenyl with $-SO_3H$) | " | phenyl with $-SO_3H$, $-N(CH_3)-CH_2$ | " | " |

EXAMPLE 5

9.6 parts by volume of trigenortriazine (sic) are added dropwise at 0° C. to a well-stirred solution of 69.8 parts of the intermediate dye prepared in Example 1, No. I. The pH is kept at 5.5 by simultaneously adding sodium hydroxide solution. After completion of the condensation, 6.6 parts by volume of 2-amino-ethanol are added all at once, the pH is kept at 7.5 by adding more sodium hydroxide solution, and the mixture is slowly warmed to room temperature. When the condensation is complete, the dye of the formula

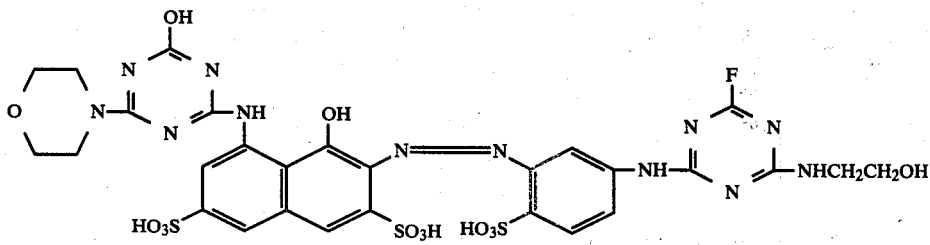

15 is isolated by adding NaCl, in the conventional manner. The product dyes cotton in a brilliant red shade which has good fastness properties and is easily dischargeable.

Further, equally good dyes of the same shade are obtained by proceeding as described in Example 5, except that in place of ethanolamine an equivalent amount of one of the following amines is used: ammonia, methylamine, dimethylamine, ethylamine, diethylamine, diethanolamine, taurine, methyltaurine, n-butylamine, aniline, cyclohexylamine, N-methylaniline, N-ethylaniline, 2-anilinoethanol, o-toluidine, m-toluidine, p-toluidine, m-chloroaniline, p-chloroaniline, o-anisidine, p-anisidine, p-phenetidine, p-aminobenzoic acid, aniline-3-sulfonic acid, aniline-4-sulfonic acid, 3-amino-acetanilide, 4-amino-acetanilide, 3-amino-phenyl-oxamic acid, 3-aminophenylurea, 4-aminophenylurea, morpholine, 2-aminobenzthiazole, 2-aminothiazole and dehydrothio-p-toluidine-5-sulfonic acid.

DYEING INSTRUCTION I 2 parts of the dye obtained according to Example 1 and 0.5 part of sodium m-nitrobenzenesulfonate are dissolved in 100 parts of water. The resulting solution is used to impregnate a cotton fabric to a wet pick-up of 75% of its weight, which is then dried.

The fabric is then impregnated with a solution, at 20°, which contains 5 grams of sodium hydroxide and 300 grams of sodium chloride per liter; thereafter it is squeezed off to 75% wet pick-up and the dyed fabric is steamed for 30 seconds at 100° to 101°, rinsed, soaped for quarter of an hour in a boiling 0.3% solution of a non-ionic detergent, rinsed and dried.

DYEING INSTRUCTION II 2 parts of the dye obtainable according to Example 1 are dissolved in 100 parts of water.

The solution is added to 1,900 parts of cold water, 60 parts of sodium chloride are added and 100 parts of a cotton fabric are introduced into this dyebath.

The temperature is raised to 40° and after 30 minutes 4 parts by volume of 30% strength sodium hydroxide solution, 10 parts of calcined sodium carbonate and a further 60 parts of sodium chloride are added. The temperature is then kept at 40° for 30 minutes, after which the dyed fabric is rinsed, soaped for 15 minutes in a boiling 0.3% solution of a nonionic detergent, rinsed and dried.

What is claimed is:
1. An azo dye of the formula

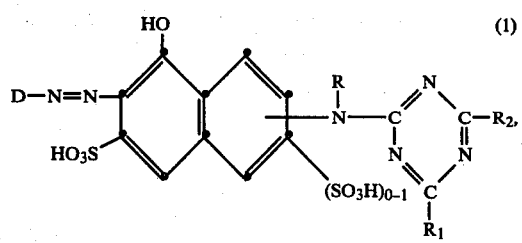

wherein D is benzene, naphthalene, benzoylaminobenzene, azobenzene or stilbene, which is unsubstituted or substituted by alkyl of 1 to 4 carbon atoms, alkoxy of 1 to 4 carbon atoms, phenoxy, alkanoylamino of 1 to 6 carbon atoms, benzoylamino, amino, alkylamino of 1 to 4 carbon atoms, phenylamino, alkoxycarbonyl of 1 to 5 carbon atoms, alkylcarbonyl of 1 to 5 carbon atoms, nitro, cyano, acetyl, carbamoyl, ureido, hydroxy, carboxy, halogen or sulfo, and which contains dihalo-s-triazinylamino or monohalo-s-triazinylamino substituted by methyl, ethyl, phenyl, $C_{1-4}$-alkylthio unsubstituted or substituted by carboxy; phenylthio, naphthylthio, hydroxy, $C_1$-$C_6$-alkoxy unsubstituted or substituted by carboxy; $C_{1-6}$-alkoxyalkoxy, $C_{1-6}$-alkoxyalkoxyalkoxy, cyclohexyloxy, phenoxy unsubstituted or substituted by chloro, nitro, carboxy or sulfo; naphthoxy unsubstituted or substituted by sulfo; —$NH_2$, $C_{1-6}$-mono- or -dialkyl-amino unsubstituted or substituted by $C_{1-2}$-alkoxy, chloro, hydroxy, carboxy, sulfo, sulfato or phenyl; cyclohexylamino, phenylamino unsubstituted or substituted by methyl, chloro, acetylamino, β-sulfato-ethylsulfonyl, nitro, hydroxy, methoxy, ethoxy, carboxy or sulfo; N-$C_{1-2}$-alkyl-N-phenylamino, N-β-hydroxyethyl-N-phenyl-amino, naphthylamino unsubstituted or substituted by sulfamoyl, hydroxy or sulfo; pyridylamino, benzthiazolyl-(2)-amino, quinolinylamino, pyrimidylamino, morpholino, piperidino, piperazino or 2-sulfo-4-(6'-methyl-7'-sulfobenzthiazol-2-yl)-phenylamino; wherein the halo-s-triazinylamino is bonded directly or via methylene to a ring carbon of D, and the amino bridging member by which the halo-s-triazinyl is bonded to a carbon atom in D is unsubstituted or substituted at the nitrogen atom by $C_{1-4}$-alkyl or -sulfoalkyl, R is hydrogen or alkyl of 1 to 4 carbon atoms, and $R_1$ and $R_2$, independently of one another, have the same meaning as those substituents referred to above of the monohalo-s-triazinyl in D; or a heavy metal complex thereof.

2. An azo dye according to claim 1, of the formula

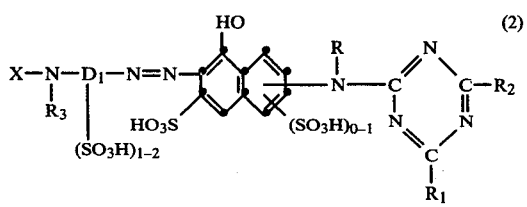

in which $D_1$ is benzene or naphthalene which is unsubstituted or substituted as defined in claim 1, X is fluoro-s-triazinyl or chloro-s-triazinyl as defined in claim 1, $R_3$ is hydrogen or alkyl of 1 to 4 carbon atoms, R is hydrogen or alkyl of 1 to 4 carbon atoms, and $R_1$ and $R_2$, independently of one another, are as defined in claim 1.

3. An azo dye according to claim 2, in which X is monofluoro-s-triazinyl or monochloro-s-triazinyl as in claim 2, $R_3$ is hydrogen or methyl, R is hydrogen or methyl, and $R_1$ and $R_2$, independently of one another, are hydroxyl or amino unsubstituted or substituted as in claim 2.

4. An azo dye according to claim 3, of the formula

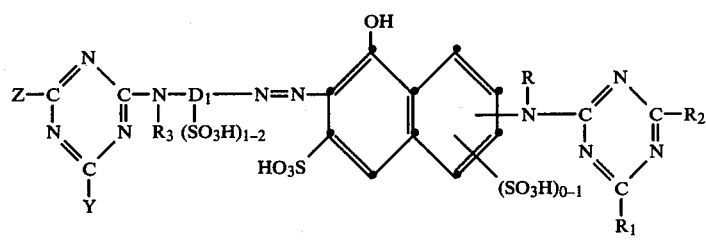

in which $D_1$ is sulfobenzene radical, sulfobenzene-$CH_2$-, which is unsubstituted or substituted by methoxy, or sulfonaphthalene-$CH_2$-, Y is fluorine or chlorine, Z is amino, $C_{1-4}$-alkylamino or N,N-di-$C_{1-4}$-alkylamino, in which the alkyls are unsubstituted or substituted by hydroxyl or sulfo, or is cyclohexylamino, or is phenylamino which is unsubstituted or substituted in the phenyl nucleus by methyl, methoxy, ethoxy, chlorine, carboxyl, sulfo, β-sulfatoethylsulfonyl, acetylamino, oxaloamino or ureido, or is morpholino, benzthiazolyl-2-amino, thiazolyl-2-amino or 4-methyl-5-sulfobenzthiazolyl-2-phenylamino, or is N-$C_{1-2}$-alkyl-N-phenylamino, in which the alkyl is unsubstituted or substituted by hydroxyl, or is $C_{1-4}$-alkoxy or $C_{1-2}$-alkoxy-$C_{1-2}$-alkoxy, $R_3$ is hydrogen or methyl, R is hydrogen or methyl and $R_1$ and $R_2$, independently of one another, are hydroxyl, methoxy, isopropoxy, phenoxy, amino, β-hydroxyethylamino, N,N-di-β-hydroxyethylamino, β-sulfoethylamino, β-carboxyethylamino, N-methyl-N-β-sulfoethylamino, phenylamino, sulfophenylamino, carboxyphenylamino, sulfo-carboxyphenylamino, N-methyl-N-phenylamino or morpholino.

5. An azo dye according to claim 4, of the formula

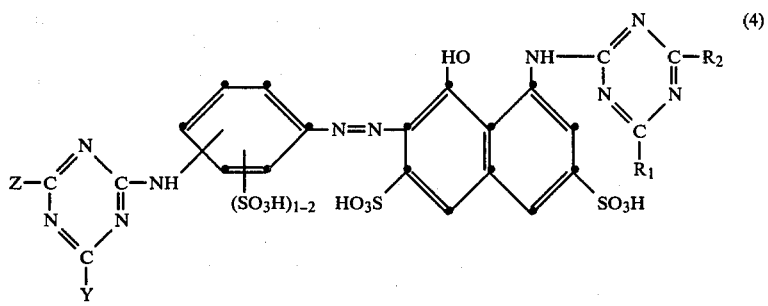

in which Y, Z, $R_1$ and $R_2$ are as defined in claim 1.

6. An azo dye according to claim 5, of the formula

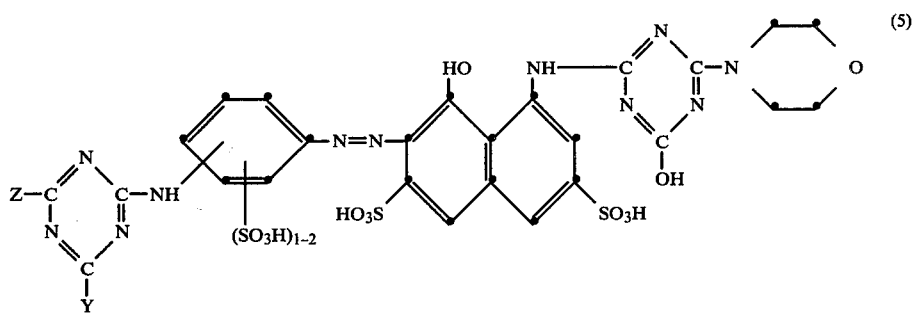

in which Y and Z are as defined in claim 5.

7. An azo dye according to claim 6, in which Y is fluorine.

8. The azo dye according to claim 7, of the formula

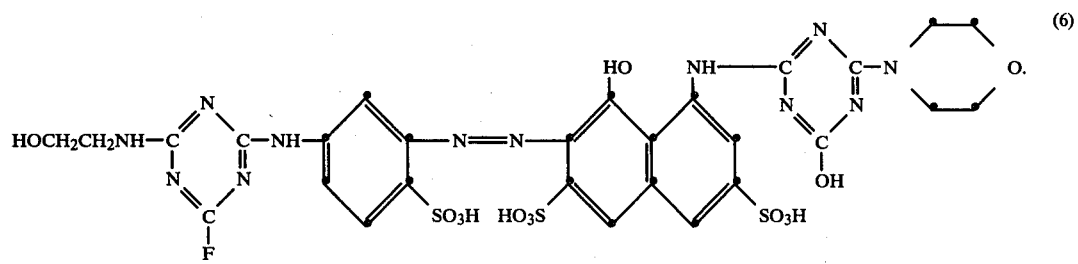
9. The azo dye according to claim 7, of the formula
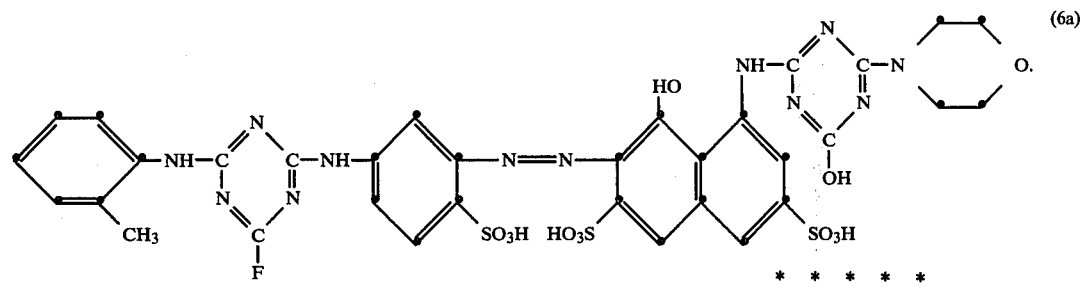

UNITED STATES PATENT AND TRADEMARK OFFICE
CERTIFICATE OF CORRECTION

PATENT NO. : 4,447,357

DATED : May 8, 1984

INVENTOR(S) : Hölzle et al

It is certified that error appears in the above-identified patent and that said Letters Patent is hereby corrected as shown below:

Col. 8, line 25                   Delete "-3-" and substitute -- 3- --

Col. 23, line 65                After "sulfobenzene" delete --radical--

Signed and Sealed this

Sixteenth Day of April 1985

[SEAL]

Attest:

DONALD J. QUIGG

Attesting Officer           Acting Commissioner of Patents and Trademarks